United States Patent [19]

Strickland

[11] Patent Number: 4,473,386
[45] Date of Patent: Sep. 25, 1984

[54] METHOD AND APPARATUS FOR FIBER PRODUCTION FROM HEAT SOFTENABLE MATERIAL

[76] Inventor: Edward T. Strickland, 2500 Kalakaua, #1704, Honolulu, Hi. 96815

[21] Appl. No.: 515,606

[22] Filed: Jul. 21, 1983

[51] Int. Cl.³ ............................................. C03B 37/08
[52] U.S. Cl. ................................................ 65/1; 65/2; 264/176 F; 264/177 F; 425/463; 425/465; 425/467
[58] Field of Search ...................... 65/1, 2; 264/176 F, 264/177 F; 425/463, 465, 467

[56] References Cited

U.S. PATENT DOCUMENTS

| | | | |
|---|---|---|---|
| 2,489,508 | 11/1949 | Stalego | 65/1 |
| 3,333,932 | 8/1967 | Tiede | 65/1 |
| 3,574,581 | 4/1971 | Strickland et al. | 65/1 |
| 3,640,670 | 2/1972 | Paliyenko et al. | 425/382 |
| 3,652,753 | 3/1972 | Shemdin | 264/177 |
| 3,738,789 | 6/1973 | Shemdin | 425/464 |
| 3,836,346 | 9/1974 | Stalego | 65/1 |
| 3,905,790 | 9/1975 | Strickland | 65/2 |
| 3,986,853 | 10/1976 | Coggin, Jr. et al. | 65/2 |
| 4,032,314 | 6/1977 | Coggin | 65/1 |
| 4,033,742 | 7/1977 | Nichols et al. | 65/2 |
| 4,088,467 | 5/1978 | Shono et al. | 65/2 |
| 4,142,850 | 3/1979 | Phillips | 425/461 |
| 4,285,712 | 8/1981 | Thompson | 65/2 |
| 4,311,499 | 1/1982 | Eisenberg et al. | 65/1 |
| 4,349,364 | 9/1982 | Morrison | 65/2 |

FOREIGN PATENT DOCUMENTS 636976 12/1934 Fed. Rep. of Germany ............ 65/1

Primary Examiner—Robert L. Lindsay, Jr.
Attorney, Agent, or Firm—Allan Redrow

[57] ABSTRACT

An apparatus and method for forming fibers from thermo-plastic material that can be liquified and drawn into elongated filaments that are subsequently cooled to form the fibers is shown wherein the system automatically accomplishes the substantially instantaneous rebirth of a fiber forming filament if there should be a breakage of any filament during an otherwise normal production run.

48 Claims, 23 Drawing Figures

METHOD AND APPARATUS FOR FIBER PRODUCTION FROM HEAT SOFTENABLE MATERIAL

FIELD OF INVENTION

This invention relates to the formation of filaments from a heat softened fiber forming material such as glass.

PRIOR ART STATEMENT

The following U.S. Patents illustrate the state of the art as known by the inventor:

U.S. Pat. No. 2,489,508 to Stalego—Nov. 29, 1949
U.S. Pat. No. 3,640,670 to Paligenko et al—Feb. 8, 1972
U.S. Pat. No. 3,652,753 to Shemdin—Mar. 28, 1972
U.S. Pat. No. 3,738,789 to Shemdin—June 12, 1973
U.S. Pat. No. 3,836,346 to Stalego—Sept. 17, 1974
U.S. Pat. No. 3,905,790 to Strickland—Sept. 16, 1975
U.S. Pat. No. 3,986,853 to Coggin, Jr. et al—Oct. 19, 1976
U.S. Pat. No. 4,033,742 to Nichols et al—July 5, 1977
U.S. Pat. No. 4,088,467 to Shono et al—May 9, 1978
U.S. Pat. No. 4,142,850 to Phillips et al—Mar. 6, 1979
U.S. Pat. No. 4,285,712 to Thompson—Aug. 25, 1981
U.S. Pat. No. 4,349,364 to Morrison—Sept. 14, 1982

This invention is an improvement on the basic fiber forming apparatus and method shown in my earlier U.S. Pat. No. 3,905,790. In that patent there is shown means for issuing a plurality of closely spaced streams of molten fiber forming material from a multiplicity of closely spaced orifices that in one example has capillary grooves between the orifices to limit the flooding damage in the event of a fiber break. While the functioning of this structure assists in fiber coalescence, it requires the expenditure of time to clear each orifice on start up and once a break occurs during a production run, separation of the fluid flow into individual fiber forming streams flowing from each orifice cannot usefully occur without the attendance of an operator or spinner who must use an air wand to reestablish the separate fiber stream flow from each of the individual orifices. This apparatus cannot be usefully employed without an operator in attendance to reestablish fiber formation at each of the involved orifices after a break occurs.

U.S. Pat. Nos. 2,489,508 and 3,836,346 illustrate certain advances in the earlier art intended to improve fiber formation. Stalego's apparatus provides a structure having relatively widely spaced orifices in a bushing, the exit ends of which orifices are each surrounded by a projection 14 that provides a cell-like construction around the exit that is said to assist in the formation of large fibers by preventing flooding of the underside of the bushing and yet permits molten fluid to flow from one tip 14 to a neighboring tip through passages 20, shown in FIG. 3, to permit one orifice to feed two tip when one orifice becomes clogged. As shown in FIG. 2, the assembled tips 14 constitute the bottom of the bushing and form a flooded surface in effect, the fibers being drawn from the individual cell at the end of each exit. U.S. Pat. No. 3,836,346 illustrates another fiber forming means that is typical of the practice prior to my invention of a bushing having a much greater density of orifices and procedure for using that bushing under the control of an operator at all times for forming fibers by drawing the fibers from spaced orifices without the individual fiber forming streams interfering one with another.

The prior art includes examples of extrusion orifices in bushing plates having other than round shapes, which are an essential feature of the present invention. As will appear more fully below, however, none of these prior art teachings utilizes the other than round orifice shown in the respective patents, to function in the manner taught herein. In these patents, no cooperative relationship with another orifice is shown or suggested that can function to effect a rebirth of a fiber forming stream automatically.

U.S. Pat. Nos. 3,640,670, 3,652,753, 3,738,789 and 4,142,850 all show other than round orifices for extruding streams of a fluid or a material in a flowable plastic form having a relatively low surface tension and high viscosity in a manner to have a crossection, that is hardened to produce a finished fiber having an other than round shape. In each of these prior art teachings, the extrusion orifices are operative to establish the ultimate, other than round, crossectional shape of the formed fiber. The shape of such fibers is controlled in order to produce a desired texture or feel in the finished fiber product or to improve fiber production by eliminating the kneeing action resulting from extrusion of fiber forming streams from the orifices having otherwise conventional shapes. Referring specifically to FIG. 8 in the 3,640,670 patent, two spaced apart other than round extrusion orifices, are shown and in this instance, the spacing between these cooperating orifices is such that the two fiber forming streams of material are made to coalesce down stream of the orifice exits and are hardened and bonded together to form a fiber having a T-shaped crossection which prevents a kneeing of the fiber as extrusion and hardening progresses.

The other patented disclosures that should also be incorporated herein by reference together with the patents mentioned above, are my earlier mentioned bushing invention showing the closely spaced orifices construction included in U.S. Pat. No. 3,905,790, which describes the basic conditions for operating the apparatus of this invention.

U.S. Pat. Nos. 3,905,790, 3,986,853, 4,033,742 and 4,349,364 all show systems for improving fiber production that describe the presence at times of an operator skilled in the use of a manually controlled means for the clearing of localized flooding usually involving an area that encompasses a more or less large number of orifices, which flooding invariably occurs on the flat underside of a conventional bushing after breakage occurs in a fiber forming stream down stream from the bushing. U.S. Pat. No. 3,986,853 proposes to effect some control of the breakage problem by a precise temperature management of the bushing and the streams of glass formed at the orifices in the bushing to assist the operator. U.S. Pat. No. 4,033,742 uses an angular adjustment and cycling of the flow of cooling gas, together with precise variation of the bushing temperature to clear the start up flood and a hand lance described at the bottom of column 7 of this patent, is used by the operator when fiber breakage occurs and localized flooded conditions are encountered. U.S. Pat. No. 4,349,364 shows a fiber forming bushing having tips or projections extending downwardly from its underside, each tip being provided with a plurality of closely spaced circular orifices. Should a fiber break during a fiber manufacturing run, the entire surface of that tip becomes flooded and individual fiber formation from each orifice of the tip can be restarted with an operator controlled wand 36 described in column 5 lines 50+ as is conventional in operating any flat sided bushing undersurface having closely spaced orifices. Flooding of the entire bushing underside in this teaching is said to be precluded by the boundaries provided between the individual tips which construction obviously limits the close spacing of all the orifices. As a flood occurs under each tip either at start up or during a run, an enlarged fluid stream fed by the several orifices at each tip is pulled from that tip by the weight of the glob of the flood that is pulled downwardly by gravity until the tip can be cooled by a water spray from the operator's wand. The apparatus shown in my prior invention U.S. Pat. No. 3,905,790 is subject to fiber breakage and localized flooding upon occasion and an operator must always be present to correct this flooding as soon as it occurs otherwise the flooding condition will continue to expand over the underside of the bushing.

U.S. Pat. No. 4,088,467 discloses another system for forming fibers from a molten heat softened material in which a bushing having a multiplicity of closely spaced orifices is made of a material that has non-wetting properties with respect to molten glass, for example, so that the liquid effluent from the exit opening of the orifices bulges from the exit from its orifice and engages a bulging effluent from a neighboring orifice. As described in column 4 beginning in 9, it is stated that the viscosity of the glass increases as the combined beads from these flooded orifices grow together to blanket the underside of the bushing until the weight of the growing blob covering the underside of the bushing pulls the molten glass flowing from the orifices downwardly by gravity to attenuate the liquid into streams to be congealed into fibers. This invention is based on the weight of the blob serving to initiate fiber pulling due to the change in viscosity of the liquid molten glass so that when the blob grows sufficiently heavy to produce a sufficient pull, the mass drops from the bushing to attenuate the liquid streams that are then pulled from the orifices by the weight of the blob, which action can occur more easily because the bushing is made of the non-wetting material. Apparently breakage of one fibre entails a reflooding of a large area of the underside of the bushing of this invention, possibly even the entire underside of the bushing, to effect a restarting of fibre forming operations.

The manufacture of fibers from heat softened material of low viscosity and high surface tension by pulling such liquid streams from the respective orifices as disclosed in the typical patents discussed above, is invariably accompanied at one time or another by breakout of fiber formation. When this happens for example in the glass fiber pulling process making use of a bushing having closely spaced orifices, a more or less extensive area of the underside of the bushing becomes flooded when a single fibre stream breaks and therefore, detection and curing the growing flooding condition which inherently developes on the underside of the conventionally known bushings is essential, because the flooding interfers with the continued pulling of many of the neighboring fibers unless the operator promptly eliminates the flood. Thus, means to detect flooded conditions as shown in U.S. Pat. No. 4,285,712, have been proposed and the presence of an always attentive operator has always been required to run an efficient production system. Even under the best of conditions, flooding under a number of orifices usually occurs before remedial action can begin to take effect, therefore, to some extent, the uniform quality of the resulting composite strand cannot be always assured.

BRIEF DESCRIPTION OF THIS INVENTION

The apparatus to be used in the performance of this invention proceeds on the basis of the known art to make use of a bushing plate having a multiplicity of closely spaced orifices to produce the maximum number of fibers within a given bushing area but makes use of a certain novel arrangement of and specially shaped adjacent orifices that are made to cooperate one with another to effect an almost instantaneous and automatic rebirth of the broken fiber forming stream. By following the conventional melting and general fiber forming procedures outlined in the patents described above, a heat softened molten material having a relatively low viscosity and high surface tension is flowed through the orifices of the herein described bushing to produce individual fluid streams that are attenuated and subsequently hardened in the known manner to produce round fibers as they flow away from the bushing. As distinguished from the known art, however, if a fiber forming stream flowing from an orifice of this invention is broken downstream from the bushing at any time during a production run, the orifice with the broken stream and its cooperating adjacent orifice structure function automatically to almost immediately effect a rebirth of that broken fiber stream without there being a disruption of any of the other viable fiber forming streams except for the stream issuing from the cooperating orifice.

The rebirth of the broken fiber stream is automatically produced by manipulating the effluent or sequela of the low viscosity high surface tension fluid that forms at the exit from the one orifice that was feeding fluid to the stream that is now broken. In order to effect fiber rebirth, the sequela is directed toward and caused to almost immediately have cohesive contact with the neighboring viable stream that is issuing from the adjacent cooperating orifice. The viable stream which is continuously being pulled along to form a fiber, acts as a vehicle to pick up the fluid of the sequela from the broken fiber forming stream which now cohers thereto, to pull the molten effluent forward to temporarily form a composite fiber that is fed by the fluid flowing from the two cooperating orifices. Almost instantaneously and while these two joined streams are being pulled along a joint fiber forming path, the structure of these cooperating adjacent orifices produces a particular constraint on the flow of the liquid of the double stream whereby the unique structure of the cooperating orifices enforces a desired effect on the combined liquid stream to cause the double stream to be broken again into two separate streams each being fed respectively, one from each of the cooperating orifices to effect an almost instantaneous rebirth of the broken fiber forming stream without detracting in any way from the continued flow of fluid in the fiber forming stream from the cooperating orifice.

The unique bushing of this invention is provided with a multiplicity of other than round orifices, each of which is designed to have an elongated axis in at least one direction. Adjacent cooperating orifices are positioned in a novel three dimensional arrangement, one with respect to the other, in order to make use of the flow characteristics of a molten fluid having high surface tension and low viscosity that flows through these cooperating orifice structures to automatically instigate the desired fiber rebirth process almost immediately after a fiber forming stream breaks. At least one end of the elongated axis of each of the respective non-round orifices is provided with a unique shape and is positioned close to the wall of an adjacent orifice such that when a fiber forming stream flowing from one orifice is broken downstream of the bushing, the sudden release of the attenuating fiber pulling force in that broken stream produces a sudden aftermath effect or sequela at the exit side of its orifice, that is manipulated by the uniquely shaped end of the elongated axis of that orifice to cause the oncoming effluent of the material emanating from this exit into the sequela to have a face-off with or in effect, to spill over and flow over this shaped end portion of the axis along the underside the bushing toward the wall of the adjacent orifice with which that end of the malfunctioning orifice cooperates. As the sequela or spillover expands rapidly under the control of the shaped end of the orifice, this liquid overflow comes quickly into cohesive contact with the viable, vehicular stream that continues to flow from the adjacent cooperating orifice. Immediately upon contact, the continuing unbroken viable stream pulls the liquid material in the sequela along with it so that a fiber forming stream fed by the two cooperating orifices continues. But, as the fiber forming pull from the winder continues to be exerted on this combined stream that is fed from both orifices, the stresses engendered in the stream by the pulling forces produced by the winding means acting against the mass of liquid flowing from the shaped cooperating pair of orifices, are operative to quickly and without the need of any operator attention, to effect a separation of the dual stream into the original two separate streams that were flowing from the adjacent cooperating orifices before the break, whereby to complete the rebirth of the broken fiber stream so that the two separate fibers are again produced from the individual streams flowing separately from the two respective neighboring orifices.

The basic form of the structure provided to accomplish this automatic rebirth of a broken fiber by making use of the uniquely three dimensionally shaped cooperating orifices, includes the use of indentations pressed upwardly into the bushing from the underside thereof at, at least one end of the elongated axis of each non-round orifice where that end of the orifice is closely spaced from the wall of its cooperating adjacent orifice. These respective indentations cooperate with the axes of the non-round orifices to manipulate the flow of the sequela as described above to effect an automatic rebirth of a broken fiber stream. In the preferred form of the invention, each of these indentations has two degrees of inward pressing and the first depression includes a deeper indentation forming an apex at the actual junction of the end of each elongated axis with the cooperating wall of its neighboring orifice and a second, less severe, degree of depression that need not always, but preferably does include the entire length of the elongated axes of both of the cooperating orifices.

The invention including its best mode of construction is described in more detail below.

IN THE DRAWINGS

Figure 11:
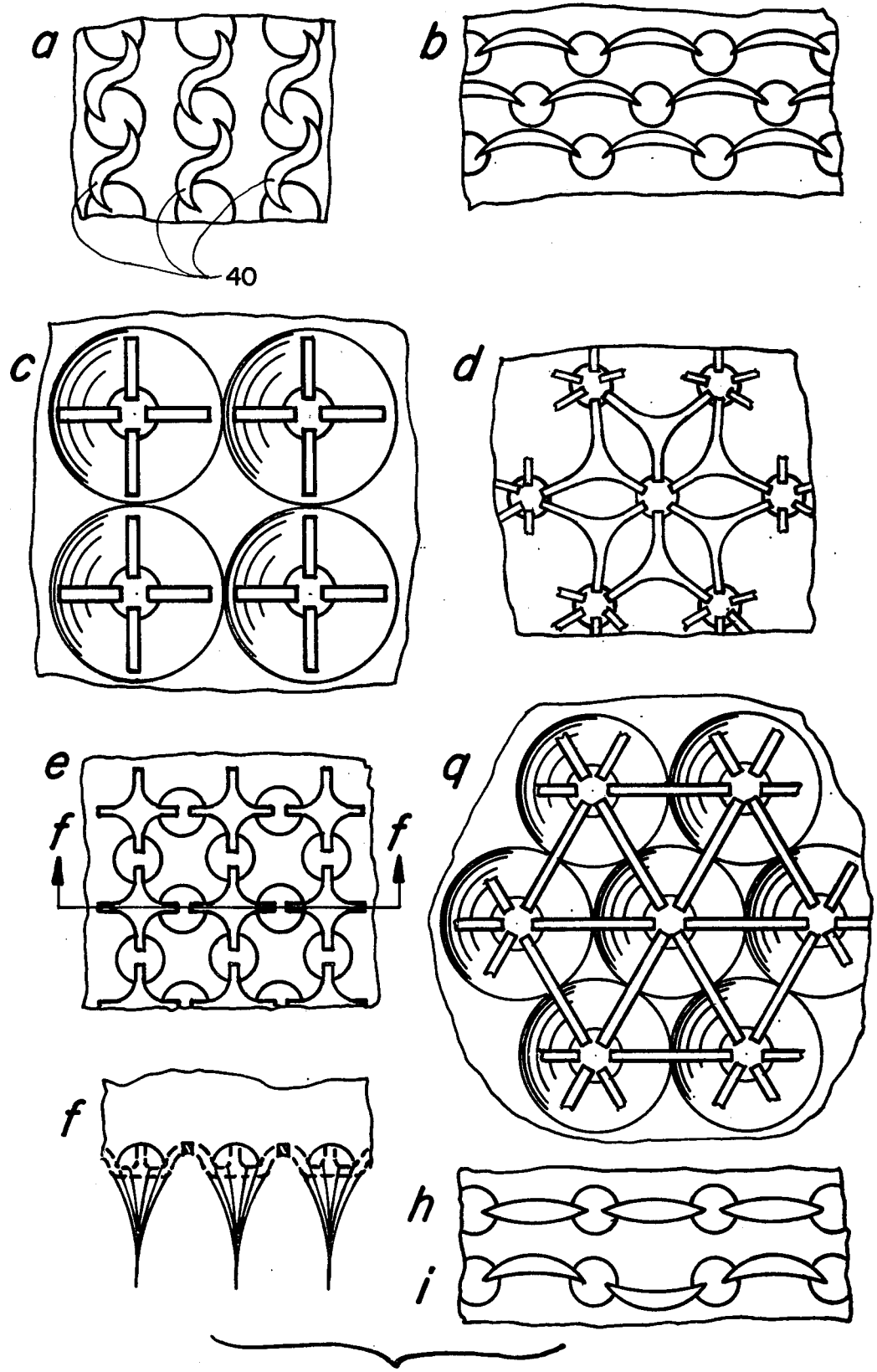
Figure 12:
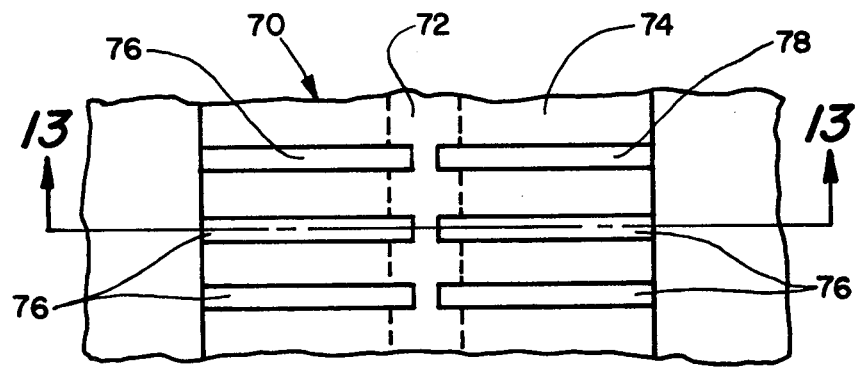
Figure 13:
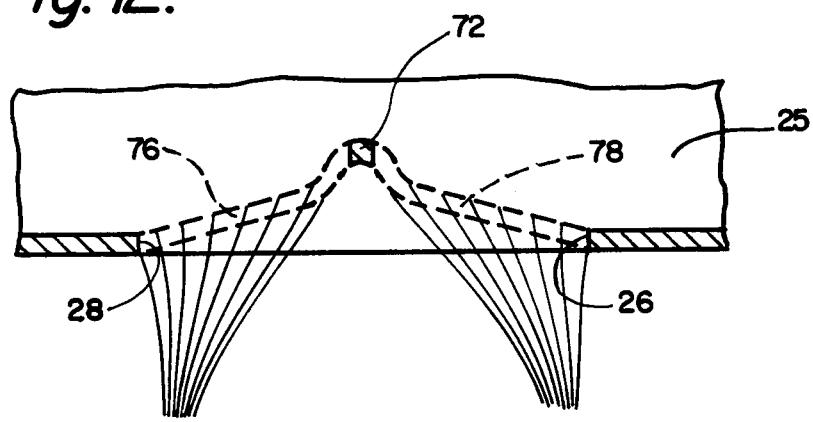
Figure 15:
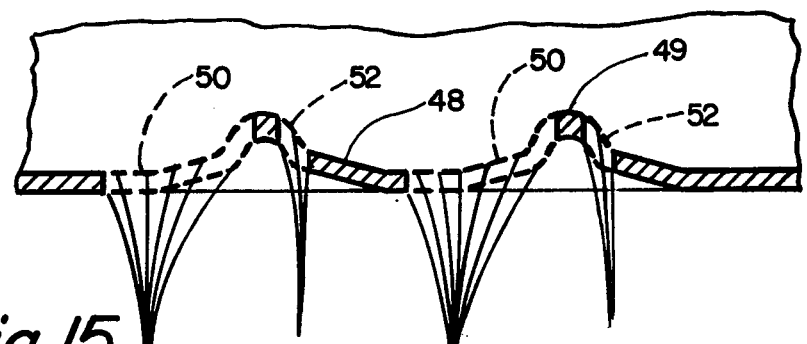
Figure 14:
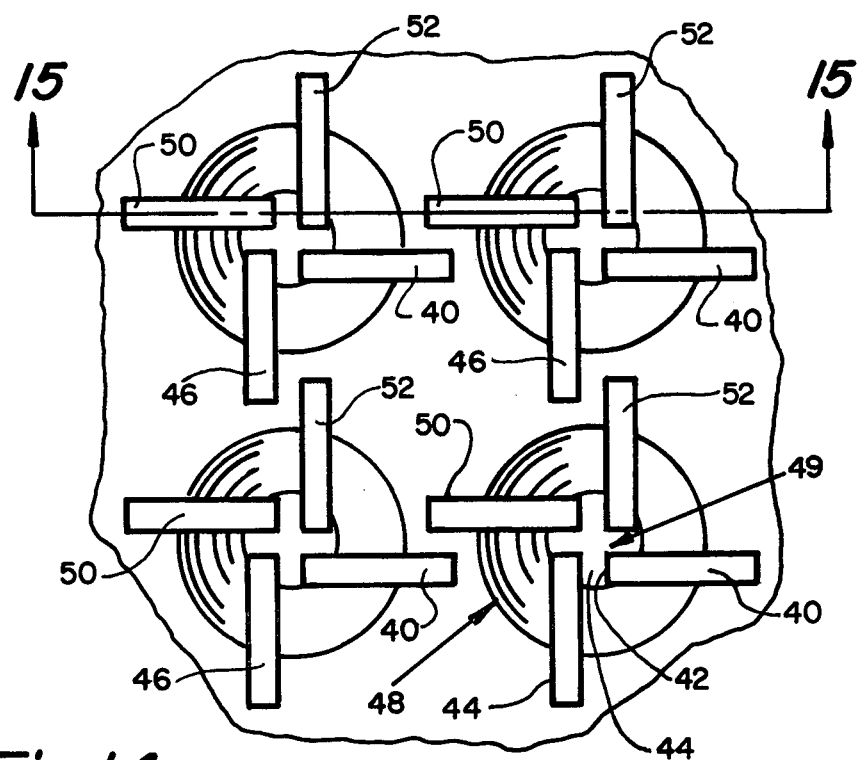

FIG. 11, in views a through e and g through i show views of several different typical orifice shapes that can be cut into the bushing, FIG. 11f is a section taken on line f—f of FIG. 11e;

FIG. 12 is a plan view showing a series of elongated rectangular orifices arranged in side by side parallel relation;

FIG. 13 is a sectional view taken on line 13—13 of FIG. 12;

FIG. 14 is a plan view showing another useful orifice arrangement;

FIG. 15 is a sectional view looking along line 14—14 of FIG. 14; and

Figure 16:
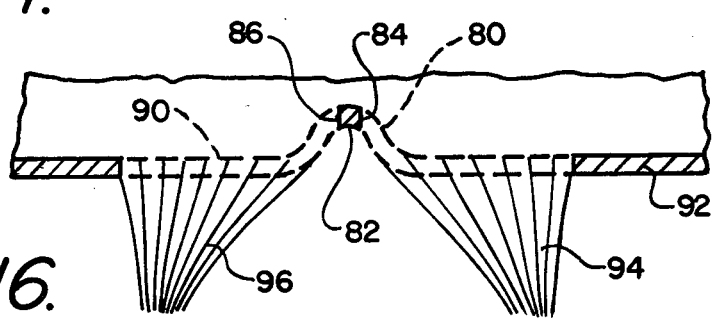

FIG. 16 is a sectional view of a modified form of the invention.

DETAILED DESCRIPTION

Figure 1:
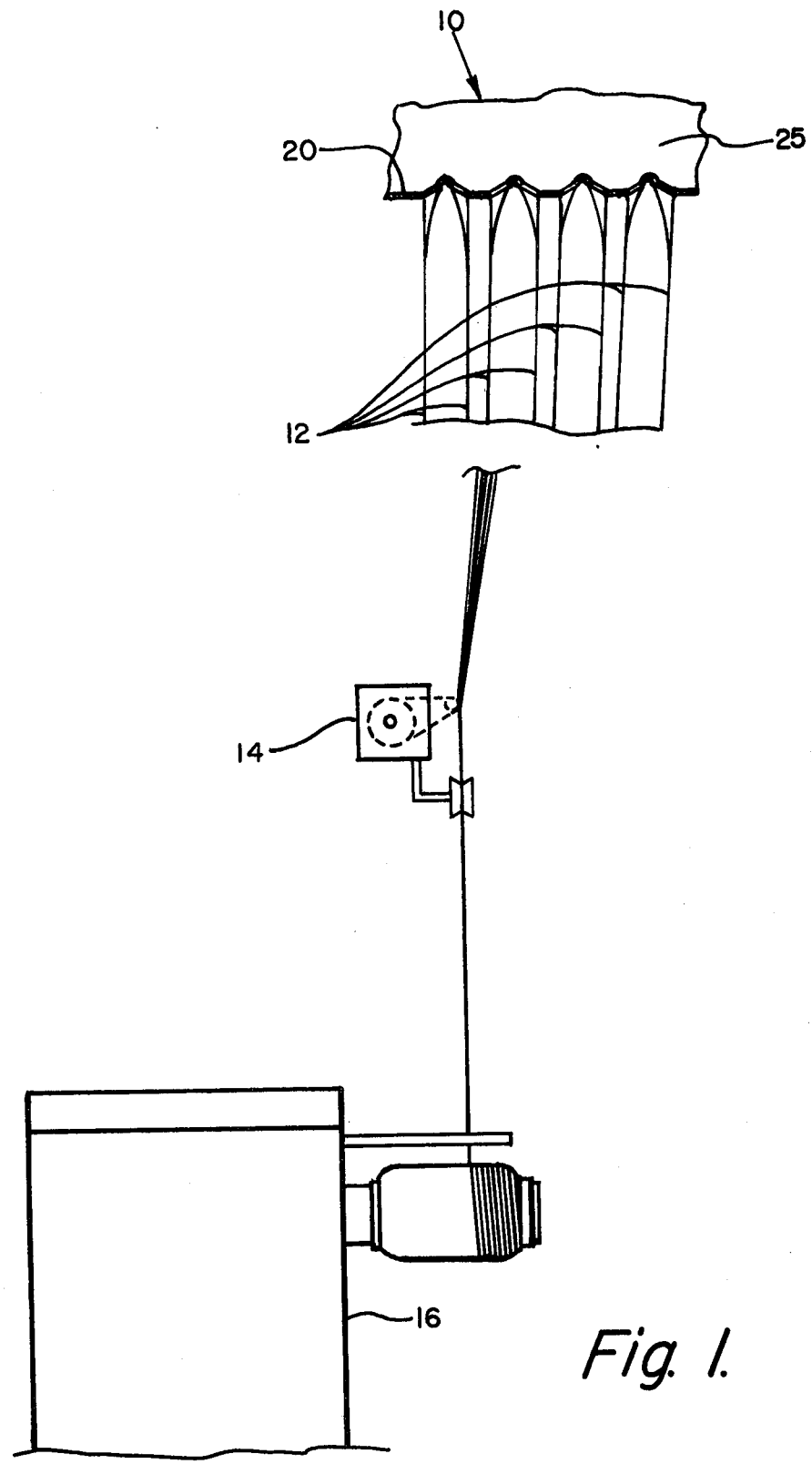
FIG. 1 is a diagramatic assembly view showing a fiber drawing system making use of this invention.

As is well known, thin continous fibers can be formed under the appropriate conditions by rendering certain materials fluid with the application of heat, flowing this heat softened liquid with a low viscosity and high surface tension through orifices in a bushing plate, then pulling the liquid from each orifice to attenuate that liquid into a stream, and then solidifying the plurality of individual streams by cooling them and winding the fibers so formed on a rotating collet. An apparatus typically provided for performing this process for the manufacture of glass fibers from E glass, is shown in FIG. 1, it includes a stream feeder assembly 10 from which a plurality of streams 12 of a heat softened liquid glass material flows. These multiple streams are cooled in a controlled environment to become individual fiber strands that may be coated or sized by an applicator 14 as they are collected into a single bundle and move onto a collet of a winder 16.

Figure 2:
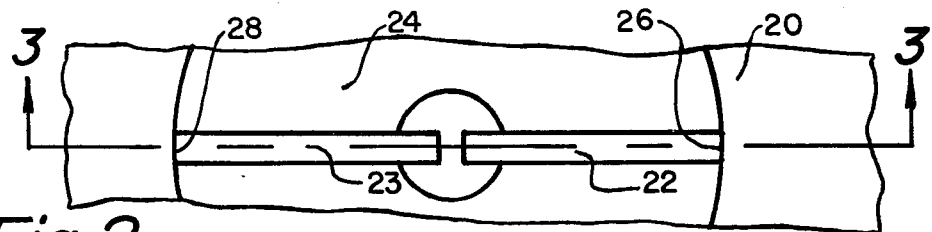
FIG. 2 is a top plan view partly broken away and with the molten liquid removed, showing a bushing constructed in accordance with this invention.

The present invention is concerned with the structure of the bushing plate 20 shown in FIG. 1 that supports a body of molten glass 25 for example, the invention more specifically being concerned with a detailed arrangement of the various orifice structures that are provided in the floor of the bushing such as is shown in more detail in FIG. 2 and in other modified forms in some of the other figures, which orifice structures function to minimize the problems that arise when a fiber forming stream breaks downstream from the bushing during a production run. When a fiber forming stream is disrupted, it is essential that the flow of that stream be re-established as quickly as possible and the rebirth should be accomplished in so far as possible without disturbing the flow of any of the other streams closely adjacent the broken stream. In accordance with this invention, such a rebirth of the broken stream flow is produced automatically and almost instantaneously after a breakage occurs without interfering with any neighboring streams except for that stream that issues from a neighboring cooperative orifice. The typical cooperating orifice designs for a bushing that are shown herein cause the liquid streams flowing through its uniquely shaped orifices to react in such a manner as to effect the desired rebirth of a broken stream by cohesively engaging the liquid sequela at the exit end of the orifice that fed liquid to the broken fiber forming stream with a viable neighboring vehicular stream issuing from its adjacent cooperating orifice whereby the fluid flowing from both orifices may now be pulled momentarily and simultaneously in a common path. The joining of the liquid in the sequela with the viable stream takes place automatically and almost instantaneously, and thereafter the stream fed by liquid from both orifices is almost immediately separated into two streams, each individual stream again flowing from its respective orifice to reestablish the two streams each moving in its former independent path.

Figure 3:
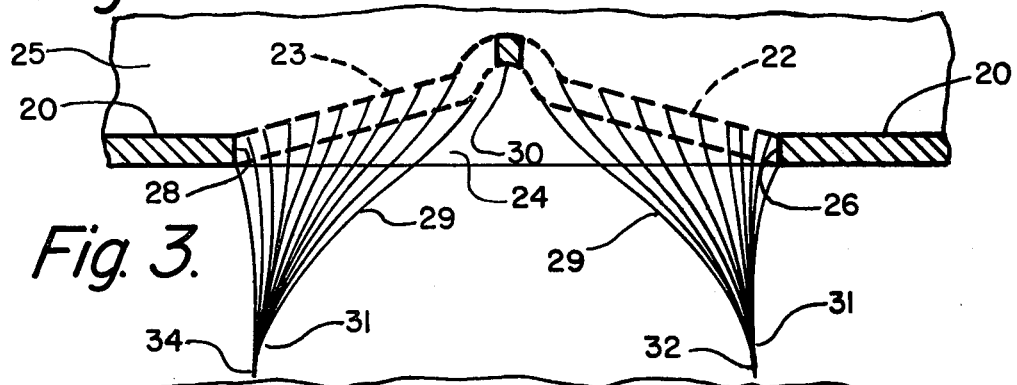
FIG. 3 is an enlarged view taken on line 3—3 of FIG. 2, showing the two viable fiber forming streams flowing from their respective orifices.

Referring to FIGS. 1, 2, and 3, a preferred form of the bushing and the closely spaced elongated orifice means of this invention is shown, which includes bushing plate 20 for producing fibers from E glass. Such bushing has the usual dimensions designed to provide a support for a multiplicity of orifices adapted to produce the desired number of streams for forming the individual fibers. One fiber is formed from each liquid stream of this heat softened glass material which has been liquified to have a high surface tension/low viscosity ratio and each stream is pulled from the bushing at a speed to provide a sufficent time interval following the stream's exit from the bushing to attenuate the liquid and allow the surface tension to be reduced to its lowest energy state to produce a round rod before the liquid hardens into the desired fiber. An E glass formula heated to 1140° C. is made to flow from each of the individual orifices in the respective pairs of elongated, adjacent, cooperating, non-round orifices 22 and 23. The bushing preferably is made of a thin metallic sheet as shown in my U.S. Pat. No. 3,905,790, the disclosure of which is incorporated herein by reference, but the bushing is modified for this invention by being provided with a multiplicity of indented areas or fossas 24 pushed upwardly from the underside of the plate. A typical fossa may be formed by making an indentation of from 0.08 to 0.12 cm in depth, but this dimension is not really critical. The preferred shape of such a fossa structure is shown in the details of FIGS. 2 and 3. The preferred cooperating pairs of orifices 22 and 23 that are produced in each of the respective fossa are cut in the shape of elongated rectangular slots and for forming E glass fibers, each slot has dimensions in the range of from 0.508 mm to 2.0 mm long and from 0.127 mm to 0.5 mm wide. These elongated slots are cut in the fossa pressed upwardly into the floor of the bushing with the longitudinal axes of the orifices in general alignment. The adjacent ends of the elongated axes of these cooperating orifices are separated by a bridge 30 having a width varying from 0.35 mm to 0.635 mm in width.

The indented fossa areas 24 each preferably include a double degree of depression, the first degree is a deeply coined pit at bridge 30 that forms an apex in the fossa that encompasses just the bridge and ends of the slots at the justaposed ends of the elongated axes of the cooperating orifices 22 and 23, and a second less severe degree of depression that does not always necessarily but preferably does encompass the entire length of both of the elongated axes of the cooperating slots. The fossa shown in FIG. 2 is a circular or pit-like impression pressed upwardly from the underside of the bushing while the fosse shown in FIG. 12 is more of a rectangular moat-like depression having the same two degrees of impression which as will appear more fully below, cooperates with pairs of cooperating slots to produce the same desired result. The fossa or fosse may be made with merely one degree of depression but preferably the two degrees of depression are provided to more efficiently complete the desired cohesive attachment of the sequela of the broken stream to the neighboring vehicular stream and the rebirth of a fiber forming stream after it has broken. The dynamic reaction of the liquid flowing through the elongated orifices cut in such fossas 24 causes the almost instantaneous automatic rebirth cycle to come about in the sequence described below.

There are a plurality of such fossa areas 24 throughout the working face of the bushing and in the preferred form of the invention, each fossa may be designed to encompass more than one pair of cooperating orifices, but for ease in understanding the basic concept of the operation of this invention, it will be explained as if only one pair of cooperating orifices is cut into each single fossa area having the two degrees of depression.

Figure 4:
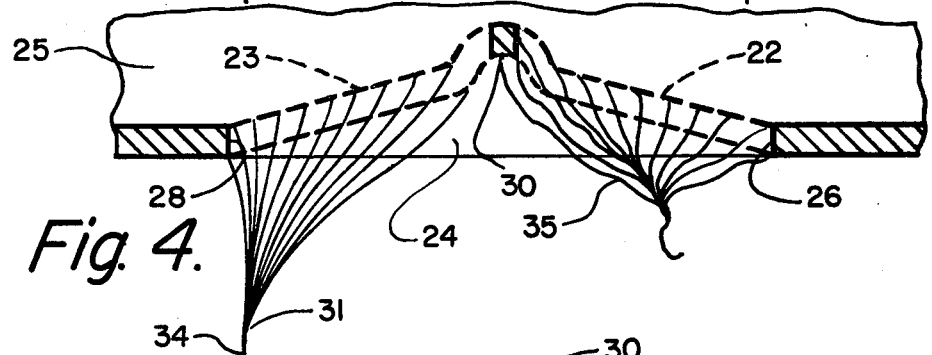
FIG. 4 is a view similar to FIG. 3 showing the molten fluid flow through neighboring orifices at the instant when a fiber forming stream flowing through one of the orifices breaks.

As seen best in FIG. 3, the second, less severe degree of the depression 24 of the fossa encompasses the opposite extreme ends 26 and 28 of the respective longitudinal axes of the orifices 22 and 23. At the bridge 30 where the inner ends of the longitudinal axes of the two orifices are juxtaposed, the first, or deepest degree of fossa depression produces a somewhat dome-shaped apex configuration. The dimension of the width of the bridge which separated the ends of the respective longitudinal axes is sufficient to maintain a stable separation between each of the viable fiber forming streams flowing from each orifice 22 and 23 yet is so close as to permit the almost instantaneous cohesive contact of the sequela of the broken stream with the viable stream flowing from the other orifice whenever a fiber forming stream breaks. The purpose of this apex structure is to position the juxtaposed ends of the elongated orifices to be turned inwardly slightly to face each other under the bridge 30 so that when a fiber forming stream breaks the sequela at the orifice that fed that stream moves under the bridge because of the shape of this apex, to produce the desired instantaneous contact of the sequela with the viable stream flowing through the cooperating orifice. As shown in FIG. 4, this face off of the liquid in each orifice at the juxtaposed ends of the axes, directs the flow of the fluid of the sequela in the exit of the orifice leading to a broken filament to cause the liquid in the sequela to flow under the bridge 30 and move into cohesive contact with the viable stream flowing from the other cooperating orifice.

During a normal fiber production run, as shown in FIG. 3, heat softened material in liquid form flows through each orifice 22 and 23 and all of the other pairs of orifices in the various fossas in the bushing to produce a plurality of individual fiber forming strands. After fiber production is established and the fibers are being wound on the collet of winder 16, the continuing pull of the winder attenuates the liquid in each stream so that the flat liquid stream flowing out of the elongated exit of each of the respective orifices 22 and 23 is drawn through a somewhat triangular pattern 29 with a base having a length equal to the elongated axis of the rectangular crossection at the exit of the orifice and the flowing mass is drawn from the base to a point 31 which has a circular crossection, the point 31 being spaced downstream from the base. As the liquid is pulled through the pattern of the area 29, the liquid is drawn inwardly toward the vertical centerline of the triangular mass by the surface tension in the fluid to form a round stream at point 31 having a circular crossection. Thereafter the stream established at point 31 is cooled and gradually coalesces to produce the desired round fiber, one of which flows from each of the elongated orifices.

It is evident that the fiber forming pull that attenuates the liquid in the triangular mass 29 tends to pull the liquid mass down hill over the second degree of the fossa slope of orifice 22, for example, toward its end 26. Similarly the mass of liquid feeding the fiber forming stream flowing from orifice 23 is pulled toward its down hill end 28. As long as production proceeds normally, the viable fiber forming streams from all of the orifices are thus separated and directed along their separate paths by the pull of the winder against each of the liquid streams flowing from the individual orifices in each of the respective fossas.

When the production run proceeds smoothly, each one of the elongated orifices in each of the respective pairs of the cooperating orifices feeds the liquid heat softened material to is respective fiber forming stream as shown in FIG. 3. The pull of the winder draws each of the viable streams in effect, somewhat downhill along the second degree portions of the indented fossa surface toward the distal extremes 26 and 28 of their respective cooperating elongated orifices, as shown in FIG. 3, to become stabilized as far apart as is necessary to maintain the two viable streams flowing from each orifice, even though the triangular bases 29 of their fiber forming streams are so close together at their juxtaposed ends as to be nearly in contact one with another. Fluid flows through the separate orifices to form attenuated circular streams that are cooled to harden into round fibers 32 and 34 that are pulled generally perpendicularly away from the flat bottom surface of the bushing with the somewhat triangular patterns of liquid 29 flowing from the respective orifices feeding each of the respective fiber forming streams.

Figure 5:
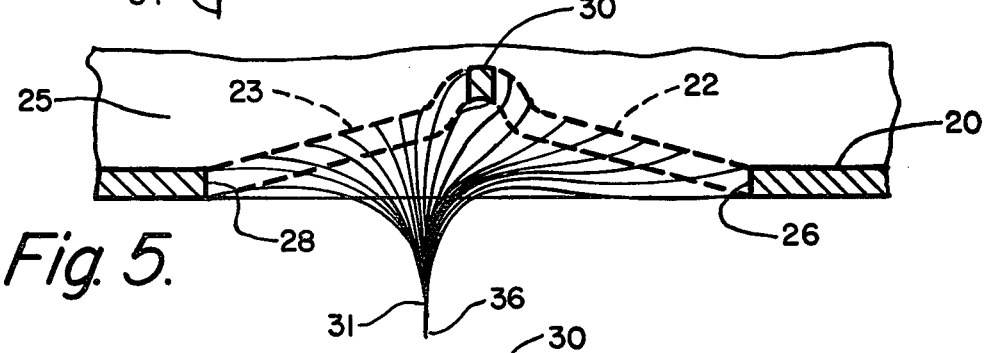
FIGS. 5 through 10 show the several stages of the fluid flow through both orifices, and illustrate the action that takes place immediately after the break occurs, as shown in FIG. 4.

If all goes well after production has been established as generally described in any prior patent such as 905,790, individual fiber forming streams flow continuously from all the orifices to produce the desired multiplicity of fibers that are collected to form a bundle of fibers that becomes the strand wrapped on the collet of winder 16. However, upon occasion, the continuous flow of a fiber forming stream is sometimes interrupted. When that happens, for example when the fiber or fiber forming stream under orifice 22 is broken, as illustrated in FIG. 4, the attenuating pull on the liquid stream is discontinued and the effluent from orifice 22 continues to flow to produce an aftermath or sequela effect at the exit from the orifice. This sequela results when the fiber forming pull is broken and when the pull against the liquid triangular feed zone 29 of the broken stream no longer draws apex 31 down toward end 26 of orifice 22, the liquid tends to back up and the continued although somewhat diminished flow of liquid through the orifice produced by the head of liquid over the bushing, produces the sequela 35 as shown in FIG. 4. The sequela continues to expand as the head of liquid glass over the bushing above the orifice of the broken stream causes more fluid to appear at the exit end of that orifice and at the apex of the fossa under the influence of the first degree of fossa impression at bridge 30, the liquid of the expanding sequela crosses under the bridge 30, at the end of the elongated axis of the orifice 22 that had been feeding the broken stream and flows toward its neighboring orifice 23, so that the liquid in the sequela comes into almost instantaneous cohesive contact with the liquid in the still viable stream issuing from the cooperating orifice 23. The liquid passing through orifice 23 continues to produce the viable fiber forming stream 34, as shown in FIG. 4, and the liquid in sequela 35 quickly flows across under the bridge 30 to cohere to this stream, as shown in FIG. 5, to produce a combined fiber forming stream 36 fed by orifices 22 and 23 that continues to flow uninterruptedly to temporarily produce a single fiber.

It should be noted here, that while the impressed fossa structure functions at all times to confine the radiant heat within the flowing molten stream as it exits from the orifice whereby to maintain the desired viscosity in the liquid being pulled to form a fiber, this aspect of the fossa is particularly useful when fiber breakage occurs, in that the control of the radiant heat flow from the liquid in the sequela maintains its low viscosity to produce the desired flow of the sequela under bridge 30 to accomplish the cohesive attachment of the sequela to the viable vehicular stream.

Because the cooperating non-round orifices are elongated and are disposed with the tip end only of the longitudinal axis of the one orifice, such as the axis of orifice 22, in close proximity to the wall of the other orifice, such as 23, at bridge 30, the volume of the liquid in the tip end of the sequela 35 that moves into cohesive contact with stream 34 is quite small and thus the cohesive attachment of the sequela to the vehicular stream is accomplished with little disturbance of the liquid flow of the viable stream. This desirable cohesive attachment of the sequela to the viable stream pulls fluid from both of the orifices 22 and 23 but the elongated configuration of the orifice 22 controls the gradual increase of the volume of the liquid issuing from that orifice 22 that must be accelerated when the sequela joins the viable stream flowing from orifice 23. The slot-shaped orifice 22, together with the second degree of depression of fossa 24, constrains the liquid in the sequela to form a long skinny mass having a delicate transverse crossection, the upper end only of which needs to be moved when the initial cohesive contact is made. Since the upper end of the sequela contains a minimum liquid mass, it poses no threat to the integrity of the vehicular stream and can be easily accelerated to move with it. As the flow of the vehicular stream continues to move onwardly, more and more of the sequela along the down hill slope of orifice 22 begins to move with the vehicular stream and because of the downward slope of this orifice positioned within the second degree of fossa impression, all of the sequela liquid is gradually assimilated in the vehicular stream to form the combined flow that produces the stream that is hardened to produce the fiber 36 shown in FIG. 5.

Due to the second degree of impression used in forming fossa 24, the exits from orifices 22 and 23 are defined by walls that gradually diverge downwardly from the apex at the underside of bridge 30. These two exits face winder 16 so that the pulling force of the winder as transmitted through the liquid mass 37, shown in FIG. 6 which pulling force tends to be substantially perpendicular to the under side of the bushing. This causes the combined liquid stream forming fiber 36 to be instantaneously centered under bridge 30.

Figure 6:
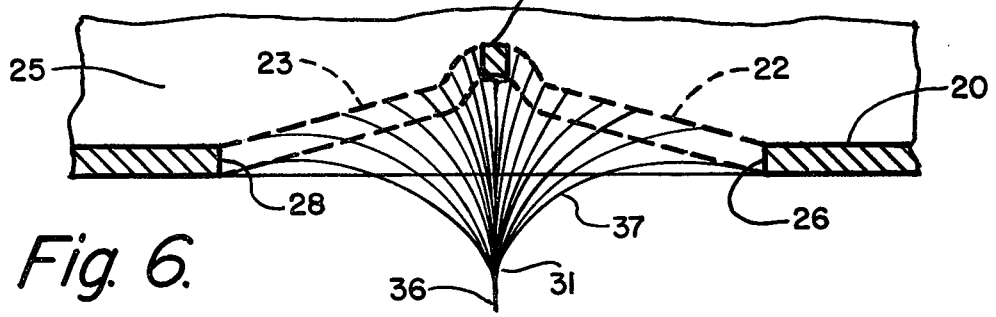
Figure 7:
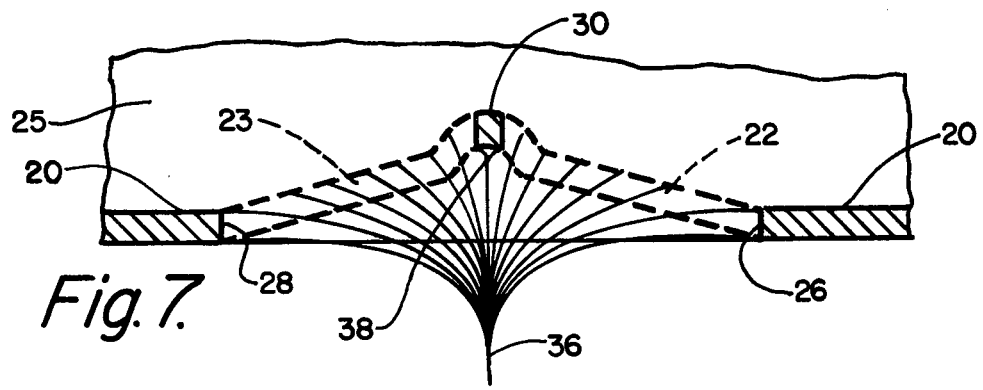
Figure 8:
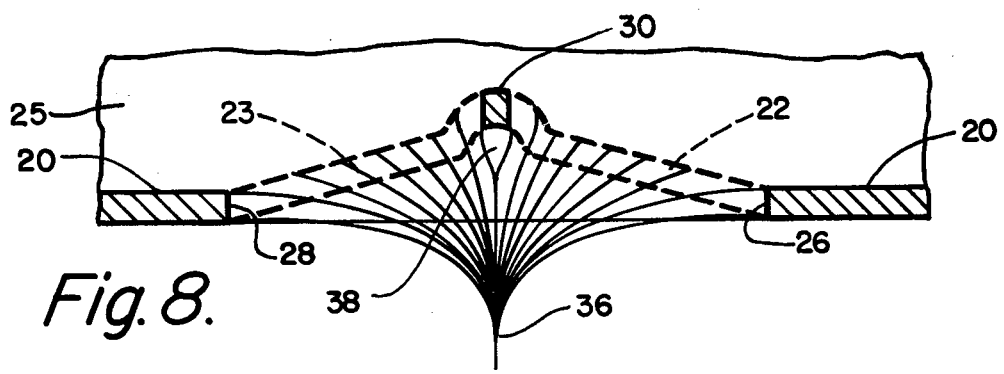
Figure 9:
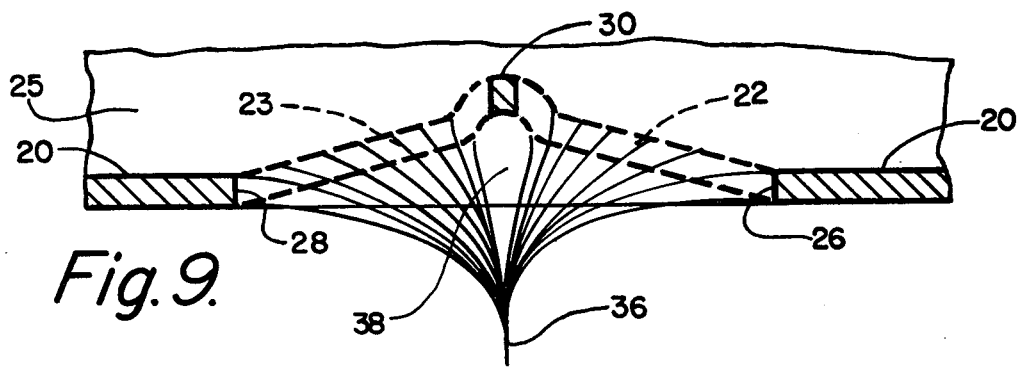
Figure 10:
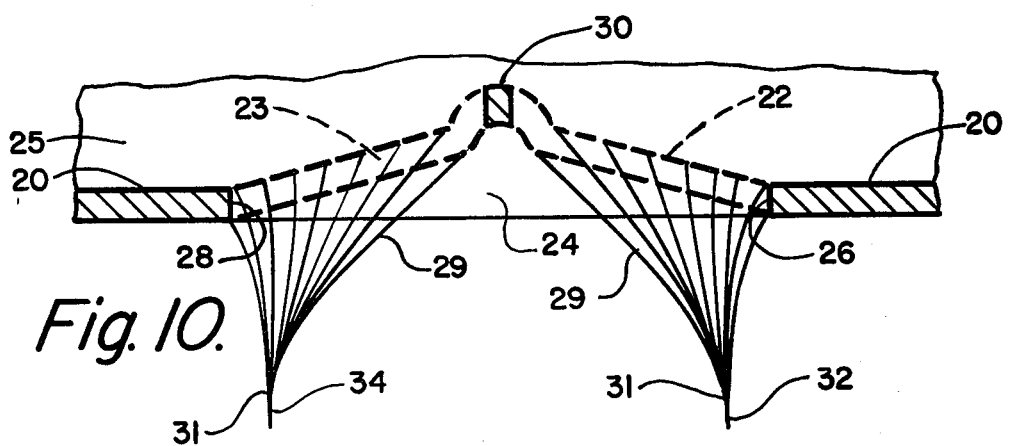

This combined stream that begins its flow as shown in FIG. 5, is initially made up of the viable strand feeding triangle 29 at orifice 23 and the sequela 35 from the other orifice 22 to ultimately produce the stabilized liquid mass 37 shown in FIG. 6 that is drawn to a center under bridge 30 to span the distance between the two extremes from end 26 to end 28 of the cooperating orifices. The liquid mass 37 fed by orifices 22 and 23 is pulled downwardly to feed stream forming fiber 36 and for the reason set forth above, quickly centers itself to produce the shape shown in FIG. 6 with the sucked-in hyperbolic sides. This triangular shape is caused by the pulling of the winder on the liquid in the combined fiber forming stream which reacts against the surface tension within the liquid mass 37. As this combined flow progresses, it is suggested that a dynamically induced suction is produced by the continued pulling against mass 37, which momentarily pulls more liquid out of the combined feed from orifices 22 and 23 than would normally flow from both orifices separately. The somewhat increased suction produced flow, however, suffers a dual hydraulic drag to the continuation of its flow from the two narrow orifice restrictions disposed on the opposite sides of bridge 30. This resistance presented to the liquid flow creates a local zone of liquid starvation on the underside of bridge 30 that causes a gap or hiatus 38 to form, into which environmental gas begins to flow, as shown in FIG. 7. As the pulling action of the winder continues on the fiber formation stream 36, the hiatus grows, as shown in FIGS. 8 and 9, so that quickly the instantaneously stabilized liquid mass 37 fed by the streams flowing from the two orifices feeding the combined stream forming fiber 36, is quickly torn asunder to accomplish the rebirth of the stream forming fiber 32 that had been broken and its separation from the other vehicular stream forming fiber 34 to reestablish the individual fiber forming streams fed by the respective orifices 22 and 23.

When the mass of fluid feeding the stream that forms fiber 36 splits to form the two separate streams again, the normal operation of fiber formation resumes with each stream forming fibers 32 and 34, drawing liquid from its respective one of the cooperative pair of orifices 22 and 23. The rebirth of the broken fiber forming stream has thus been accomplished without there being any untoward interruption of any of the other fiber forming stream activity in so far as those other streams are fed by any of the orifices of the other pairs of cooperating orifices in the bushing. It is seen that the rebirth of the broken stream has been produced without any flooding of any surrounding portion of the under surface of the bushing and has been accomplished instantaneously and automatically as an inherent function of the fiber forming process and without requiring either the attention of, or any activity on the part of, an attendent nor even the use of extraneous detection means or use of any other apparatus such as has heretofore been proposed.

While the elongated non-round orifices 22 and 23 have been shown above to be rectangular pairs of slots, other shapes of elongated non-round cooperating apertures and their associated fossas can be produced in the bushing to accomplish the same result. As shown in FIG. 11, a-i a plurality of differently shaped cooperative orifices may be provided, for example, in 11a, a pair of generally S-shaped slots 40 can be cut in a bushing having the ends of their longitudinal extremes terminating in cooperating first degree fossa areas to effect fiber stream rebirth whenever a stream flow in one orifice breaks downstream from the bushing. FIG. 11b, shows a series of crescent-shaped orifices that are useful for this purpose. FIG. 11c illustrates fossas having two degrees of impression each of which fossa encompasses a plurality of pairs of cooperating orifices. FIG. 11d shows generally star-shaped orifices that are arranged with the tips of the legs of the several stars positioned in a first degree of fossa impression to bring the end of an elongated axis close to the wall of another star-shaped orifice. FIG. 11e, is another arrangement of generally star shaped orifices and their fossas. FIG. 11f is a view taken on line f-f in 11e to show the type of the elongated axes of the cooperating orifices juxtaposed in a fossa of one degree of impression. FIG. 11g shows a variation on elongated rectangular slots and FIGS. 11h and i show other shapes and disposition of orifices wherein the tips of the elongated axis of each orifice cooperates within a fossa with the tip of the axis of another orifice.

In FIG. 12, a rectangular impressed area 70 is shown that forms a fosse or moat shaped area. This fosse is formed with a deeply impressed apex 72 that merges with the second degree of impression 74. A plurality of cooperating elongated orifices 76 and 78 are arranged in parallel with the juxtaposed ends of their elongated axes meeting along the apex 72 to produce the desired fiber regenerating means.

In addition to serving primarily to effect the rebirth of any broken streams, it should be noted that the use of the narrowed elongated orifices cut into an impressed fossa serves other useful purposes. Such elongated narrow slots act, to a certain extent, as filters to prevent infusible stones or other such debris larger than the width of the orifice from passing through the slotlike opening and further any foreign matter falling into position on the downwardly sloping upper surface of the orifice on the up stream surface of the bushing, is gradually washed downhill over the downwardly sloping top surface of the fossa over the entrance to the orifice so that foreign matter is ultimately washed away and prevented from interfering with liquid flow through the orifice.

The orifice size can be selected taking into account the head of liquid in the bath 25 over the bushing, so as to feed the designed volume of liquid through the orifice to make fine fibers or those of larger diameters, or the orifice size can be selected with regard to the temperature of the glass and winding rate of the bundle of fibers on a collet to control the degree of attenuation needed in the liquid stream to produce the desired diameter of fiber. In practice the attenuation rate should be maintained as high as possible consistent with the temperature, head pressure and glass formula or other heat softenable material being fiberized.

The fossa and pair of elongated rectangular cooperating orifices 22 and 23, that has been described above in FIGS. 2-10, illustrates a typical example of how the pair of cooperating orifices in each of the multiplicity of fossas in the bushing function to complete an automatic rebirth of a broken fiber stream when that event occurs.

In FIGS. 14 and 15 another example of a pattern of multiple pairs of cooperating orifices is shown wherein a number of such cooperating rectangular slots are shown that can be associated with any one fossa to place one end of the respective longitudinally elongated axis of one orifice in close proximity to the wall of its cooperating orifice to produce the desired rebirth of a fiber forming stream if the stream flowing through any orifice should break. In FIG. 14, the multiplicity of cooperating orifices may be cut in a single fossa wherein one rectangular orifice 40 is positioned with one end 42 of its elongated axis adjacent the bridge 44 between it and the wall of its cooperating orifice 46 and another pair of orifices 50 and 52 may likewise be provided. As seen in FIG. 15, the orifices 50 and 52 as do orifices 40 and 46, extend upwardly along the second degree of fossa impression, from the bottom side of the bushing, and the upper end of each of these orifices terminates adjacent the first degree of fossa impression at bridge 44 at the dome portion 49 of the fossa whereby the sequela of a broken stream from orifice 50 for example, is automatically made to have cohesive contact with a still viable vehicular stream flowing from orifice 52 as explained above. The several cooperating pairs of orifices 40-46, 46-50, 50-52 and 52-40 all interact within the fossa 48 and its dome 49 to effect the rebirth of any broken fiber forming stream occuring in any one of the respective pairs of these cooperating orifices. A multiplicity of such fossas each with a multiplicity of cooperating pairs of orifices may be produced in the bushing.

In practice each fossa or fosse may have a single degree of slope to form a dome or apex within its impressed area that cooperates with the ends of the axes of the cooperating orifices but preferably, these individual impressed areas are each formed with a double degree of impression, as described above. The fossa may be of circular configuration as shown in FIGS. 2 and 14, for example, or the fosse 70 may be rectangular, as in the plan view of FIG. 12 and have several pairs of closely spaced orifices arranged parallel one to another athwart that fosse. A fossa or fosse may be provided for cooperating with each pair of elongated orifices but preferably a plurality of cooperating orifices are produced in a given impressed pattern, with each impressed area, be it of a single or double degree of impression, servicing each pair of adjacent cooperating orifices. Such impressed areas are positioned to service each junction between the elongated axis of one orifice and the wall of its cooperating orifice to effect cohesive attachment of the sequela of the broken stream with a vehicular stream.

A preferred orifice pattern and a fossa arrangement having the two degrees of impression is shown in FIG. 14, wherein each fossa has a second degree of impression having a diameter of 10 mm coined into the bushing plate and each fossa has four slots formed therein that is 1 mm long by 0.25 mm wide. The separation gap at the deepest first degree of impression formed at the bridge 44 between the slots, is 0.38 mm wide. With such fossas and their cooperating orifices, a density of up to 4000 fibers can be drawn continuously from a bushing with such a pattern of fossas and orifices that has a working face of 5 cm by 12.5 cm. It is possible to design suitable bushings as taught above for drawing from 15 or less to nearly 100 streams per square centimeter from a bushing.

The preferred arrangement as described above includes fossas or fosses having two degrees of impression. It is entirely practical however to produce pairs of cooperating elongated orifices having only one degree of an impression at the juxtaposed ends of their elongated axes. Such an orifice construction is shown in FIG. 16 wherein the impressed fossa 80 forms an apex at the bridge 82 between the juxtaposed ends 84 and 86 of the elongated axes of the cooperating pair of orifices 88 and 90. The impressed apex is associated with the ends of the cooperating pair of orifices to produce a face-off of the liquid in the juxtaposed ends of the orifices while the remaining length, up to three quarters of the length of the orifice, resides in the flat floor of the bushing 92.

During a normal run, the fiber forming streams 94 and 96 are separated by the bridge and each stream is fed from its respective orifice 88 and 90 and the pull of the winder causes the separate stream feeds to be centered substantially in their respective orifices. If one fiber stream 94 should break however, the apex 84 of this fossa manipulates the sequela at the orifice feeding the broken stream to produce the desired cohesive contact of the sequela, with the face-off liquid in the vehicular stream 96 flowing from the cooperating orifice to effect a rebirth of the broken fiber as has been described above.

The apparatus of this invention, that accomplishes an automatic rebirth of any broken fiber forming streams, can conceivably be fully automated with computer controls so that a production facility can be operated without the need for any operator attendance to cure a breakout such as has always been required in the past. Fiber rebirth has been produced in the preferred form of the elongated orifice and double degree of depressed fossa in a time period of less than $\frac{1}{2}$ second with 100% success.

The apparatus described above can be used with any heat softened material that can be liquified and which liquid follows Newton's laws of liquid flow for a liquid having a high surface tension/low viscosity ratio. E glass which is liquid at 1140° C. has been mentioned above. Other glasses such as A, C, and S glass can be fiberized if such product is wanted, by the proper adjustment of the melting temperature and selection of orifice size. Organic thermoplastics such as nylon, dacron and other synthetic plastics that have the proper heat softenable characteristics to form a Newtonian liquid where the heated liquid has the desired high surface tension/low viscosity ratio, can be made into fibers more efficiently with this apparatus.

While the above describes the preferred structure of this invention and its mode of operation, it is possible that modifications thereof may occur to those skilled in the art that will fall within the scope of the following claims.

What is claimed is:

1. An apparatus for continuously forming streams of heat-softened material into a plurality of fibers by pulling the material in liquid form with low viscosity and high surface tension from the downstream side of orifices through a bushing and wherein the apparatus is adapted to accomplish the rebirth of fiber formation should any stream be broken downstream of said bushing during a production run, comprising a bushing having a floor provided with a plurality of orifices therein through which the liquid flows to exit on the downstream side thereof, each of said orifices being defined by a wall, each of said orifices having an exit that is shaped other than round and has an elongated axis in at least one of its dimensions, and pairs of said orifices being disposed to cooperate one with another with at least one of the ends of said elongated axis of one of said cooperating orifices being spaced from but juxtaposed the wall of the orifice that forms the other one of said pair of cooperating orifices, said spacing being spanned by bridging means, said bridging means being impressed upwardly in the floor of said bushing and having a dimension sufficient to maintain stable separation between the viable fiber forming streams being pulled from the downstream side of each one of the cooperating orifices yet being of a dimension such that when a fiber stream issuing from one of said pair of cooperating orifices is broken downstream from the bushing, the spacing is so close as to assure cohesive contact across said space under said bridging means between the fluid exiting from the downstream side of said orifice whose fiber stream has been broken and said viable fiber forming stream being pulled from said cooperating orifice.

2. An apparatus as in claim 1 wherein said bushing has a plurality of areas of impression with each impressed area forming a fossa pressed upwardly from the downstream side of said bushing, and each one of each of said fossas encompasses respectively at least one juxtaposed end of said elongated axis and the wall of the orifice with which it cooperates.

3. An apparatus as in claim 2 wherein said impressed area of each one of said fossas includes distinct zones having varying degrees of the depth the impression with the deepest degree of the impressed area of each fossa being located at said bridging means.

4. An apparatus as in claim 1 wherein each of said orifices has a rectangular shape and wherein said elongated axis is a longitudinal axis longer than the crosswise axis of said rectangular shape.

5. An apparatus as in claim 2 wherein each of said orifices has a rectangular shape wherein said elongated axis is a longitudinal axis longer than its cross axis.

6. An apparatus as in claim 3 wherein each of said orifices has a rectangular shape and wherein said elongated axis is a longitudinal axis longer than its cross axis.

7. An apparatus as in claim 3 wherein each of said impressed areas is of a size to include at least a pair of said cooperating orifices within each one of said fossas.

8. An apparatus as in claim 7 wherein each of said orifices is rectangular in shape and has an elongated longitudinal axis.

9. An apparatus as in claim 8 wherein said orifices are disposed in their respective fossas with their longitudinal axes in alignment.

10. An apparatus as in claim 7 wherein each of said orifices is rectangular in shape and has an elongated longitudinal axis and each of said at least a pair of said cooperating orifices is situated in their respective fossa with their longitudinal axes at right angles one to another.

11. An apparatus as in claim 7 wherein said bushing is a thin plate and said fossas are indented upwardly from the downstream side of the bushing to produce a generally dome-shaped protrusion on the upstream side of said bushing.

12. An apparatus as in claim 11 wherein each of said orifices is rectangular in shape.

13. An apparatus as in claim 12 wherein each rectangular orifice has an elongated longitudinal axis, and each pair of said orifices is situated in their respective fossas with said longitudinal axes in alignment.

14. An apparatus as in claim 12 wherein each rectangular orifice has an elongated longitudinal axis, and each pair of said orifices is situated in their respective fossas with said longitudinal axes disposed at right angles one to another.

15. An apparatus as in claim 2 wherein said fossas are each formed with an apex.

16. An apparatus as in claim 15 wherein each of said fossas is defined by a wall pressed toward an apex, and each of said walls gently slopes away from its apex toward the downstream side of said bushing.

17. An apparatus as in claim 15 wherein said respective fossas closely encompass the respective walls of the orifices associated with each fossa.

18. An apparatus as in claim 15 wherein said bushing is a thin plate and each of said respective fossa is impressed from the downstream side of the bushing to produce a generally dome-shaped protrusion on the upstream side of said bushing.

19. An apparatus as in claim 16 wherein said bushing is a thin plate and each of said respective fossa is impressed from the downstream side of the bushing to produce a generally dome-shaped protrusion on the upstream side of said bushing.

20. An apparatus as in claim 17 wherein said bushing is a thin plate and each of said respective fossa is impressed from the downstream side of the bushing to produce a generally dome-shaped protrusion on the upstream side of said bushing.

21. An apparatus as in claim 2 wherein each one of said fossas encompasses the length of a plurality of said elongated axes and their cooperating orifices.

22. An apparatus as in claim 1 wherein each of said impressed areas is circular to form individual fossas.

23. An apparatus as in claim 1 wherein each of said impressed areas is rectangular to form individual fosse.

24. An apparatus as in claim 22 wherein each of said individual fossa has two degrees of impression.

25. An apparatus as in claim 23 wherein each of said individual fosse has two degrees of impression.

26. An apparatus as in claim 24 wherein said first degree of impression is the deepest and encompasses said bridging means.

27. An apparatus as in claim 25 wherein said first degree of impression is the deepest and encompasses said bridging means.

28. An apparatus as in claim 26 wherein said second degree of impression substantially encompasses the length of said elongated axes of said orifices.

29. An apparatus as in claim 27 wherein said second degree of impression substantially encompasses the length of said elongated axes of said orifices.

30. An apparatus as in claim 29 wherein said elongated orifices are disposed in a generally parallel relationship.

31. An apparatus as in claim 6 wherein each of said rectangular shapes is 1 mm long and 0.25 mm wide and said bridging means between the end of said elongated axis and the wall of said another orifice is 0.38 mm wide.

32. An apparatus as in claim 23 wherein each of said orifices is rectangular in shape.

33. An apparatus as in claim 25 wherein each of said orifices is rectangular in shape.

34. An apparatus as in claim 27 wherein each of said orifices is rectangular in shape.

35. An apparatus as in claim 29 wherein each of said orifices is rectangular in shape.

36. An apparatus as in claim 35 wherein said orifices are arranged in a generally parallel relationship.

37. An apparatus as in claim 36 wherein each of said rectangular shapes is 1 mm long and 0.25 mm wide and said bridging means between the ends of said elongated axis and the wall of said another orifice is 0.38 mm wide.

38. An apparatus as in claim 1 wherein said pairs of cooperating orifices are S shaped.

39. An apparatus as in claim 1 wherein said pairs of cooperating orifices are crescent shaped.

40. An apparatus as in claim 39 wherein said cooperating pairs of crescent shaped orifices each cooperates with a third crescent shaped orifice at said impressed bridging means.

41. An apparatus as in claim 1 wherein said pairs of cooperating orifices are star shaped with arms radiating from a center, said arms having tip ends disposed in juxtaposed relation and said juxtaposed ends meeting at said bridging means.

42. An apparatus as in claim 2 wherein said elongated axis of each of sid orifices extends from one of said bridging means to another bridging means.

43. A method for continuously forming a plurality of fibers simultaneously from a heat softened material having a low viscosity and high surface tension by flowing the material in liquid form through a bushing having a plurality of orifices therein from the upstream to the downstream side of the bushing to produce a separate viable fiber forming stream flowing from each orifice, then pulling the streams to attenuate the liquid and cooling the attenuated liquid streams downstream from said bushing, including steps for automatically effecting the rebirth of a broken fiber forming stream comprising flowing the liquid material through pairs of adjacent cooperating orifices to produce said plurality of viable streams, controlling the shape of each of said streams to initially have a crossectional shape other than round as the respective streams exit from each of their cooperating adjacent orifices, the crossectional shape of said stream as it leaves the downstream side of its orifice being characterized by an elongated longitudinal axis, one end of which axis is closely spaced by a bridge means from the viable stream flowing from its adjacent cooperating orifice, said spacing of said end of said axis from said adjacent orifice permitting a viable stream to form and flow from each one of said orifices but being so close that when a stream is broken downstream from any orifice, the liquid at said closely spaced end of the axis of said stream which has been broken, flows directly from that end of its elongated axis into cohesive contact with the viable stream flowing from its closely spaced adjacent cooperating orifice, flowing the cohered liquid and the liquid issuing from said adjacent cooperating orifice in a single viable stream that initially continues to flow downstream from both of said cooperating orifices to form a single fiber, and then separating said cohered single stream into two viable streams one flowing from each of said adjacent cooperating orifices by pulling the combined streams forcibly from said bridge means to accomplish the rebirth of fiber formation in the formerly broken stream.

44. A method as in claim 43 wherein each of said other than round viable streams is converted to a round crossection downstream from said orifices by reason of the attenuating pulling forces and the surface tension prevailing in the liquid forming said respective streams.

45. A method as in claim 43 wherein each of said other than round streams initially exits from their respective orifices as a narrow rectangular shape.

46. A method as in claim 44 wherein each of said other than round streams initially exits from their respective orifices as a narrow rectangular shape.

47. A method as in claim 43 wherein said viable streams are pulled from the downstream side of said bushing in a manner to utilize the frictional resistance between the cohered liquid stream flowing through said adjacent orifices at said bridge means to form an initial gap in the cohered stream flow which initial gap grows as the pull is continued to ultimately effect said separation of the formerly cohered stream.

48. A method as in claim 47 wherein once said initial gap is formed, environmental gas surrounding said cohered stream is drawn into said gap to complete said separation.

* * * * *

UNITED STATES PATENT OFFICE
CERTIFICATE OF CORRECTION

PATENT NO. : 4,473,386
DATED : 9/25/84
INVENTOR(S) : Edward T. Strickland

It is certified that error appears in the above-identified patent and that said Letters Patent are hereby corrected as shown below:

Claim 3 line 3 after "depth" insert --of--.

Claim 42 line 2 change "sid" to --said--.

Signed and Sealed this

Thirtieth Day of April 1985

[SEAL]

Attest:

DONALD J. QUIGG

Attesting Officer     Acting Commissioner of Patents and Trademarks